United States Patent
Kobayashi et al.

(10) Patent No.: US 10,467,242 B2
(45) Date of Patent: Nov. 5, 2019

(54) COMPUTER PRODUCT, PROCESSING SYSTEM, AND PROCESSING METHOD

(71) Applicant: FUJITSU LIMITED, Kawasaki-shi, Kanagawa (JP)

(72) Inventors: Kenji Kobayashi, Kawasaki (JP); Toshiaki Saeki, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 389 days.

(21) Appl. No.: 15/006,518

(22) Filed: Jan. 26, 2016

(65) Prior Publication Data
US 2016/0140196 A1 May 19, 2016

Related U.S. Application Data

(63) Continuation of application No. PCT/JP2013/070664, filed on Jul. 30, 2013.

(51) Int. Cl.
*G06F 17/30* (2006.01)
*G06F 16/25* (2019.01)
*G06F 16/2455* (2019.01)

(52) U.S. Cl.
CPC ...... *G06F 16/258* (2019.01); *G06F 16/24561* (2019.01)

(58) Field of Classification Search
CPC ......... G06F 17/30569; G06F 17/30501; G06F 16/258; G06F 16/24561
See application file for complete search history.

(56) References Cited

U.S. PATENT DOCUMENTS

| | | | |
|---|---|---|---|
| 9,177,028 B2* | 11/2015 | Chambliss | .......... G06F 16/2365 |
| 2006/0225027 A1 | 10/2006 | Venkatesh et al. | |
| 2011/0314019 A1 | 12/2011 | Peris et al. | |
| 2012/0254133 A1 | 10/2012 | Hen-Tov et al. | |

(Continued)

FOREIGN PATENT DOCUMENTS

| JP | 2002-505478 A | 2/2002 |
|---|---|---|
| JP | 2011-008614 A | 1/2011 |
| JP | 2013-114626 A | 6/2013 |

(Continued)

OTHER PUBLICATIONS

International Search Report and Written Opinion of the International Searching Authority (Form PCT/ISA/210, Form PCT/ISA/220, and Form PCT/ISA/237), mailed in connection with PCT/JP2013/070664 and dated Oct. 1, 2013 (7 pages).

(Continued)

*Primary Examiner* — Huawen A Peng
(74) *Attorney, Agent, or Firm* — Fujitsu Patent Center

(57) ABSTRACT

A non-transitory, computer-readable recording medium having stored therein a processing program causes a computer to execute a process including reconstituting a specific portion of received data, based on reference information specifying a referenced portion of the received data for selecting processing data from the received data, the processing data being subject to a query processing; determining whether to discard the received data, based on the specific portion of the received data and a selecting condition for selecting the processing data; and reconstituting the received data when the determining determines not to discard the received data.

8 Claims, 16 Drawing Sheets

(56) References Cited

U.S. PATENT DOCUMENTS

2013/0091203 A1 4/2013 Araki
2013/0138686 A1 5/2013 Takahashi et al.

FOREIGN PATENT DOCUMENTS

WO 99/44139 A2 9/1999
WO 2011/158478 A1 12/2011

OTHER PUBLICATIONS

Extended European Search Report dated Jun. 15, 2016 for corresponding European Patent Application No. 13890829.8, 8 pages.
European Office Action dated Feb. 1, 2018 for corresponding European Patent Application No. 13890829.8, 7 pages.
European Office Action dated Oct. 29, 2018 for corresponding European Patent Application No. 13890829.8, 8 pages.

* cited by examiner

FIG.18

| QUERY ID | ENGINE NODE ID | QUERY PASSING RATE | PARTIAL RECONSTITUTION | PARALLEL PROCESSING |
|---|---|---|---|---|
| Q1 | 1 | 5% | VALID | POSSIBLE |
| Q1 | 2 | 3% | VALID | POSSIBLE |
| Q1 | 3 | 66% | INVALID | POSSIBLE |
| Q2 | 2 | 25% | VALID | POSSIBLE |
| Q4 | 3 | 12% | VALID | IMPOSSIBLE |
| ... | ... | ... | ... | ... |

FIG.19

| Vnode ID | id | QUERY ID | QUERY PASSING RATE |
|---|---|---|---|
| D1 | 000 - 099 | Q1 | 7% |
| D2 | 100 - 199 | Q1 | 13% |
| D3 | 200 - 299 | Q1 | 86% |
| D4 | 300 - 399 | Q1 | 77% |
| ⋮ | ⋮ | ⋮ | ⋮ |
| D1 | 000 - 099 | Q2 | 14% |
| D2 | 100 - 199 | Q2 | 24% |
| ⋮ | ⋮ | ⋮ | ⋮ |

| QUERY ID | Vnode ID | ENGINE NODE ID |
|---|---|---|
| Q1 | D1 | 1 |
| Q1 | D2 | 2 |
| ... | ... | ... |
| Q2 | D1 | 3 |
| Q2 | D2 | 3 |
| ... | ... | ... |

US 10,467,242 B2

COMPUTER PRODUCT, PROCESSING SYSTEM, AND PROCESSING METHOD

CROSS REFERENCE TO RELATED APPLICATIONS

This application is a continuation application of International Application PCT/JP2013/070664, filed on Jul. 30, 2013 and designating the U.S., the entire contents of which are incorporated herein by reference.

FIELD

The embodiments discussed herein are related to a computer product, a processing system, and a processing method.

BACKGROUND

A conventional technique called distributed-parallel complex event processing (distributed-parallel CEP) processes a large volume of event data by multiple queries in parallel and outputs a single final result. With distributed-parallel CEP by multiple nodes, since queries are present on multiple nodes, communication among the nodes occurs.

As a query development language, an object oriented language that takes development efficiency into consideration such as, for example, Java (registered tradename), is often employed. In the communication of structured data, serialization processing of data on the transmitting side and deserialization processing on the receiving side are performed. In object oriented language, structured data is called an object, serialization processing is called serialization, and deserialization processing is called deserialization.

With distributed-parallel CEP, there is a large volume of event data and consequently, loads placed on the nodes for serialization and deserialization are large. Further, a query, for example, is structured from preprocessing and post-processing, where in the preprocessing, deserialized event data is referenced, and determination is made whether to execute post-processing of the event data, or discard the event data.

According to a related technique, for example, in a distributed processing system using an object retaining a serialized format, to give notification of an event, an apparatus for receiving notification of a specific event in a network is registered and a request for object registration is transferred. For example, refer to Published Japanese-Translation of PCT Application, Publication No. 2002-505478.

Nonetheless, with convention techniques, a problem arises in that in the preprocessing of the query, even an event data that is to be discarded is deserialized, inviting increases in the load placed on the nodes. For example, with distributed-parallel CEP, in the preprocessing of a query, irrespective of a large amount of event data tending to be discarded, all the event data is deserialized. On the other hand, if event data is not deserialized, whether to discard the event data cannot be determined in the preprocessing of a query.

SUMMARY

According to an aspect of an embodiment, a non-transitory, computer-readable recording medium having stored therein a processing program causes a computer to execute a process including reconstituting a specific portion of received data, based on reference information specifying a referenced portion of the received data for selecting processing data from the received data, the processing data being subject to a query processing; determining whether to discard the received data, based on the specific portion of the received data and a selecting condition for selecting the processing data; and reconstituting the received data when the determining determines not to discard the received data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 18 is a diagram depicting one example of a query table 1800;

FIG. 19 is an example depicting one example of a Vnode information table 1900;

DESCRIPTION OF EMBODIMENTS

Embodiments of a processing program, a processing system, and a processing method according to the present invention will be described with reference to the accompanying drawings.

Figure 1:
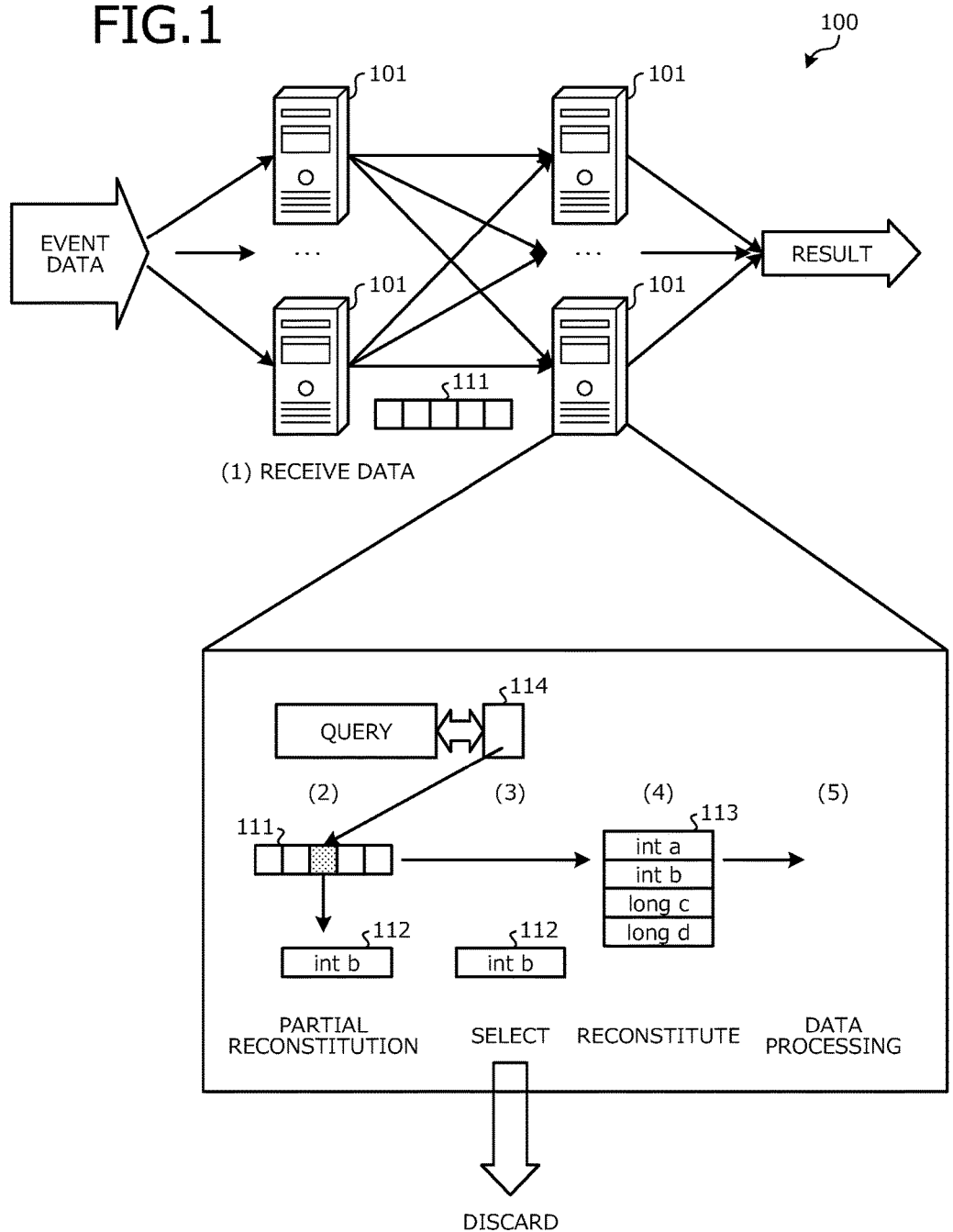
FIG. 1 is a diagram depicting one example of a processing method according to a first embodiment.

FIG. 1 is a diagram depicting one example of the processing method according to a first embodiment. In FIG. 1, a system 100 is a distributed-parallel CEP system that includes multiple engine nodes 101. In the system 100, event data generated by, for example, a sensor is transmitted to the engine nodes 101, which process the event, data, and a final result is output.

The engine nodes 101 are information processing apparatuses that receive data 111 and execute queries. A query is a program described based on predefined rules. The rules, for example, are described in a query description language such as an event processing language (EPL). The rules are translated by a compiler whereby, a query is created.

On the other hand, queries are often described using an object oriented language like Java, as a development language from the perspective of development efficiency. An object oriented language is a language suitable for programming that configures software by functional components called objects. An object models, as a set of attributes and operations, a physical or an abstract entity existing in the real world for reproduction on a computer. An object further includes structured data such as structures of C language and the like.

The data 111 is serialized event data generated by, for example, a sensor that applies a scientific principle to measure/gather temporal information and environmental information such as position, temperature, humidity, and the like. In the transmission of structured data, serialization processing of data on the transmitting side, and deserialization processing on the receiving side are performed. In object oriented language, structured data is called an object, serialization processing is called serialization, and deserialization processing is called deserialization. In the description hereinafter, as one example of query development language, object oriented language will be described.

Serialization is the serialization of object event data into byte strings to communicate the object data through a network. Deserialization is the reconstitution of data that has been serialized into byte strings, the data being deserialized into object event data. Object event data includes structured event data.

In other words, when a specific engine node 101 transmits object event data to another engine node 101, the specific engine node 101 executes serialization of the event data, creates the data 111, and transmits the data 111 to the other engine node 101. The engine node 101 that receives the data 111 that has been serialized, deserializes the data 111 and reconstitutes the object event data.

For example, in addition to data, the object event data includes a pointer and the like that indicates data position. Therefore, when transmitting event data, the engine node 101 deletes pointers and the like from the object event data and performs serialization that arranges the data in series. On the other hand, when receiving event data, the engine node 101 adds pointers and the like to the serialized data 111 and performs deserialization to reconstitute the object event data.

Here, a query is configured from preprocessing and post-processing, where in the preprocessing, deserialized event data is referenced, and determination is made whether to execute post-processing of the event data or discard the event data. The determination of whether to discard the event data is performed by referencing a portion of the deserialized event data rather than by referencing all the deserialized event data. In other words, if all the data 111 is deserialized, even portions that are not referenced are deserialized.

Thus, in the first embodiment, upon receiving the data 111, the engine node 101 reconstitutes only a specific portion of the data 111, compares the reconstituted specific portion to a condition for identifying a query processing subject, and determines whether to discard the data 111. In cases where the engine node 101 determines not to discard the data 111, the engine node 101 reconstitutes all the data 111, thereby reducing unnecessary deserialization. An example of data processing by the engine node 101 according to the first embodiment is described below.

(1) The engine node 101 receives the data 111, which is data that has been serialized to execute a query.

(2) The engine node 101 deserializes a specific portion 112 of the received data 111, based on information 114 specifying a referenced portion to select processing data to be subject to query processing. Here, the information 114 specifying a referenced portion for selecting processing data is information that exists for each query and specifies in the query, the position of information to be used in determining whether to discard event data.

In the example depicted in FIG. 1, a query describes an EPL, filter description expression that is a condition for selecting data "select a from Event A where b=1". In this case, the information 114 is information that specifies a position b in the data 111. The engine node 101 deserializes the specific portion 112 from the received the data 111, based on the information 114.

(3) The engine node 101 determines whether to discard the data, based on the reconstituted specific portion 112 and the condition for the query to select processing data. The condition for selecting data, for example, is a logical expression configured by operators that determine the matching/non-matching of a value, the magnitude of a value, the matching/non-matching of a character string, and the like.

In the example depicted in FIG. 1, the condition for the query to select processing data is "b=1". Accordingly, the engine node 101 confirms whether the reconstituted specific portion 112 is "1". Received data 111 for which the specific portion 112 is not "1" is data that is not to be used after query data selection. In this case, the engine node 101 discards the received data 111.

(4) The engine node 101, when determining not to discard the data 111, deserializes the received data 111. The engine node 101 deserializes the received data 111 and reconstitutes object event data 113. In the example depicted in FIG. 1, the engine node 101 deserializes the data 111, which includes "int a", "int b", "long c", and "long d", into the event data 113.

(5) The engine node 101 executes the query by the deserialized event data 113 and outputs execution results.

As described, the engine node 101 receives the serialized data 111 for executing the query. The engine node 101 reconstitutes the specific portion 112 of the received data 111, based on the information specifying the specific portion 112 to be referenced to select the processing data. The engine node 101 determines whether to discard the received data 111, based on the reconstituted specific portion 112 of the data 111 and the condition for selecting the processing data; and when determining not to discard the data 111, reconstitutes the data 111.

Thus, overall data deserialization is performed with respect to only the data 111 that is to be passed on to query post-processing, enabling configuration such that overall data deserialization is not performed with respect to the data 111 discarded in the query preprocessing whereby, unnecessary deserialization can be reduced. For example, with distributed-parallel CEP, a majority of event data is discarded after referencing the specific portion 112 and therefore, unnecessary deserialization can be significantly reduced.

Figure 2:
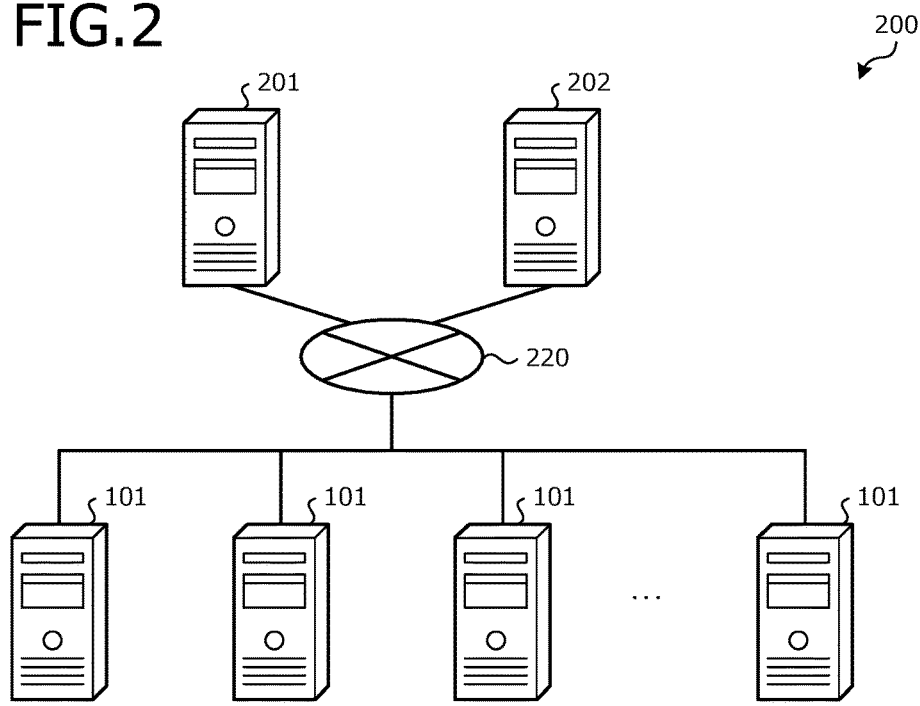
FIG. 2 is a diagram depicting an example of system configuration of a system 200 according to the first embodiment.

FIG. 2 is a diagram depicting an example of system configuration of a system 200 according to the first embodiment. In FIG. 2, the system 200 has the engine nodes 101, a manager node 201, and a compiler node 202. The engine nodes 101, the manager node 201, and the compiler node 202 are connect through a wireless or wired network 220. The network 220 is, for example, a local area network (LAN), a wide area network (WAN), the Internet, etc.

The manager node 201 is a control apparatus that manages the system 200 overall. The compiler node 202 is a node that creates a query by using a compiler to translate rules described in a query description language such as an EPL. Further, the compiler node 202 has a function of distributing the created query to the engine nodes 101. Although the manager node 201 and the compiler node 202 are depicted as independent nodes in FIG. 2, the manager node 201 and the compiler node 202 can be configured by a single node. Furthermore, the engine node 101, the manager node 201, and the compiler node 202 can be configured by a single node.

Figure 3:
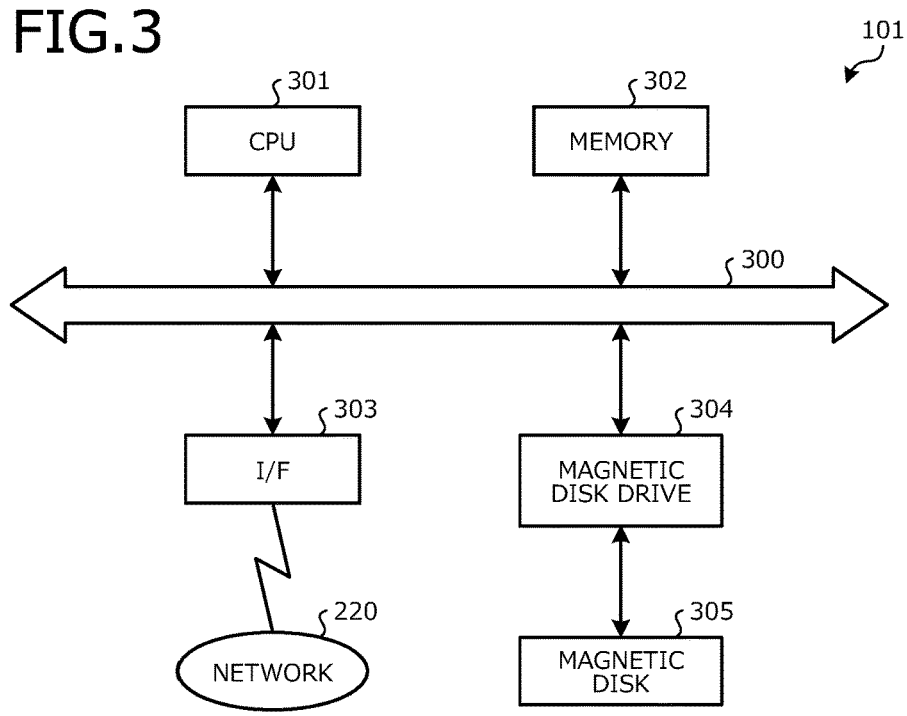
FIG. 3 is a block diagram depicting an example of hardware configuration of an engine node 101.

FIG. 3 is a block diagram depicting an example of hardware configuration of the engine node 101. In FIG. 3, the engine node 101 has a central processing unit (CPU) 301, memory 302, an interface (I/F 303), a magnetic disk drive 304, and a magnetic disk 305, respectively connected by a bus 300.

Here, the CPU 301 governs overall control of the engine node 101. The memory 302 has, for example, read-only memory (ROM), random access memory (RAM), flash ROM, and the like. More specifically, for example, the flash ROM and ROM store various types of programs, and the RAM is used as a work area of the CPU 301. The programs stored in the memory 302 are loaded onto the CPU 301 whereby, coded processes are executed by the CPU 301.

The I/F 303 is connected to the network 220 through a communications line and is connected to other computers (e.g., the manager node 201 and the compiler node 202 depicted in FIG. 2) via the network 220. The I/F 303 administers an internal interface with the network 220 and controls the input and output of data from other computers. A model, LAN adapter, and the like can be used as the I/F 303, for example.

The magnetic disk drive 304, under the control of the CPU 301, controls the reading and writing of data with respect to the magnetic disk 305. The magnetic disk 305 stores the data written thereto under the control of the magnetic disk drive 304.

In addition to the configuration above, for example, solid state drive (SSD), a keyboard, a mouse, a display, etc. may be included. Further, the manager node 201 and the compiler node 202 depicted in FIG. 2 can be realized by a hardware configuration identical to the example described above for the engine node 101.

Figure 4:
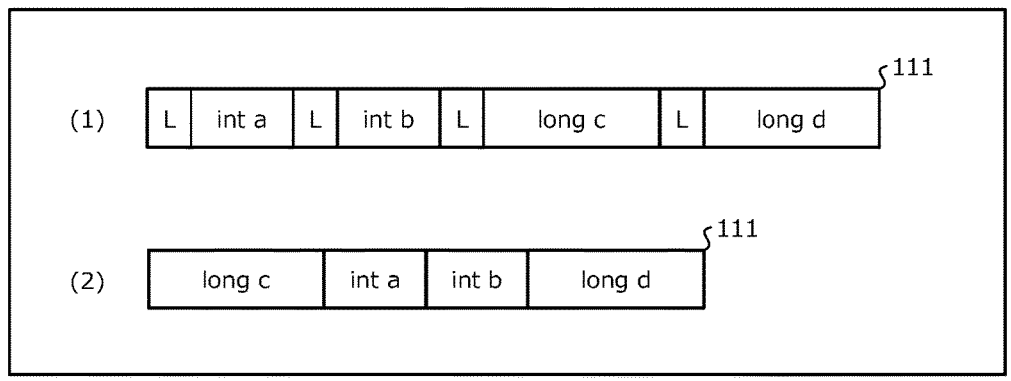
FIG. 4 is a diagram depicting one example of data 111.

FIG. 4 is a diagram depicting one example of the data 111. In FIG. 4, reference numeral (1) represents one example of a data structure of the data 111, in which parameter length and parameter data are sequentially arranged. At "L" of the data 111, the parameter length is stored and thereafter, parameter data is disposed. In this case, the engine node 101 has a parameter number as information specifying the referenced portion for selecting the processing data. For example, in the example depicted in FIG. 4, when "long c" is the portion that is to be referenced to select the data, the information specifies the third data to be the referenced portion. The engine node 101 reads the parameter length (L) from the head, skips the portion corresponding to L, again reads the parameter length (L), skips the portion corresponding to L, and arrives at the intended third parameter. After reaching the intended parameter, the engine node 101 reads "long c" and reconstitutes the specific portion of the received data.

In FIG. 4, reference numeral (2) is an example of another data structure of the data 111, in which the referenced portion for selecting the processing data is first in the arrangement. The engine node 101 has a parameter length as information specifying the referenced portion for selecting the processing data. For example, in the example depicted in FIG. 4, when "long c" is the referenced portion for selecting the data, the information specifies the parameter length of "long c" to be the referenced portion. The engine node 101 reads "long c" from the head and reconstitutes the specific portion of the received data.

Figure 5:
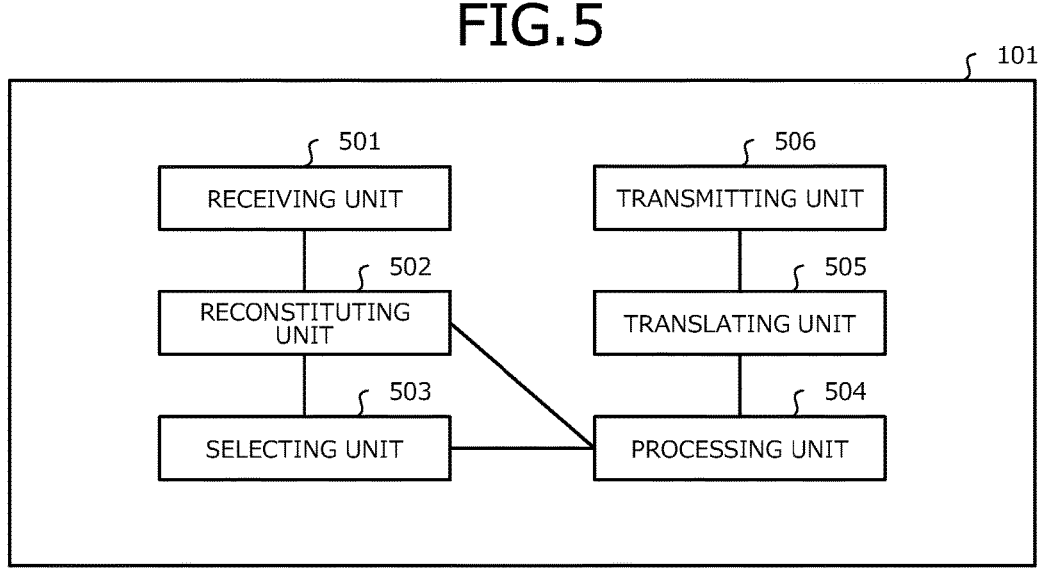
FIG. 5 is a block diagram depicting an example of functional configuration of the engine node 101 according to the first embodiment.

FIG. 5 is a block diagram depicting an example of a functional configuration of the engine node 101 according to the first embodiment. In FIG. 5, the engine node 101 is configured to include a receiving unit 501, a reconstituting unit 502, a selecting unit 503, a processing unit 504, a translating unit 505, and a transmitting unit 506. Functions of the functional units, more specifically, for example, are realized by executing on the CPU 301, the programs stored in a storage apparatus such as the memory 302 depicted in FIG. 3. Processing results of the functional units, for example, are stored to a storage apparatus such as the memory 302 depicted in FIG. 3.

The receiving unit 501 has a function of receiving the serialized data 111. For example, the receiving unit 501 receives the data 111 from a node that aggregates generated event data from sensors, etc. Further, the receiving unit 501 receives the data 111 from a specific engine node 101 that executes a query executed before the query of the engine node 101. The receiving unit 501 passes the received data 111 to the reconstituting unit 502.

The reconstituting unit 502 has a function of deserializing the received data 111. The reconstituting unit 502 deserializes the specific portion 112 of the received data 111, based on information specifying the referenced portion to select the processing data. The reconstituting unit 502 passes the deserialized specific portion 112 to the selecting unit 503. Further, the reconstituting unit 502 deserializes all the received data 111. The reconstituting unit 502 passes all the deserialized event data 113 to the processing unit 504.

The selecting unit 503 has function of determining whether to discard the received data 111, based on the deserialized specific portion 112 and the condition for selecting the processing data. Upon determining not to discard the received data 111, the selecting unit 503 passes the received data 111 to the reconstituting unit 502. Upon determining to discard the received data 111, the selecting unit 503 discards the received data 111.

The selecting unit 503 substitutes values of the specific portion 112 into a logical expression describing the condition for selecting the processing data and when the logical expression is true, does not discard the received data 111; and when the logical expression is false, discards the received data 111.

The processing unit 504 has a function of executing a query using all the deserialized event data 113. For example, the processing unit 504 executes computation processing such as summing parameters of the event data 113. The processing unit 504 further executes processes such as generating an alarm when a parameter of the event data 113 is a predetermined value or greater. The processing unit 504 passes to the translating unit 505, data generated by execution the query.

The translating unit 505 has a function of serializing into byte strings, the data generated by the processing unit 504. The translating unit 505 passes the serialized data to the transmitting unit 506.

The transmitting unit 506 has a function of transmitting the serialized data to another engine node 101.

Figure 6:
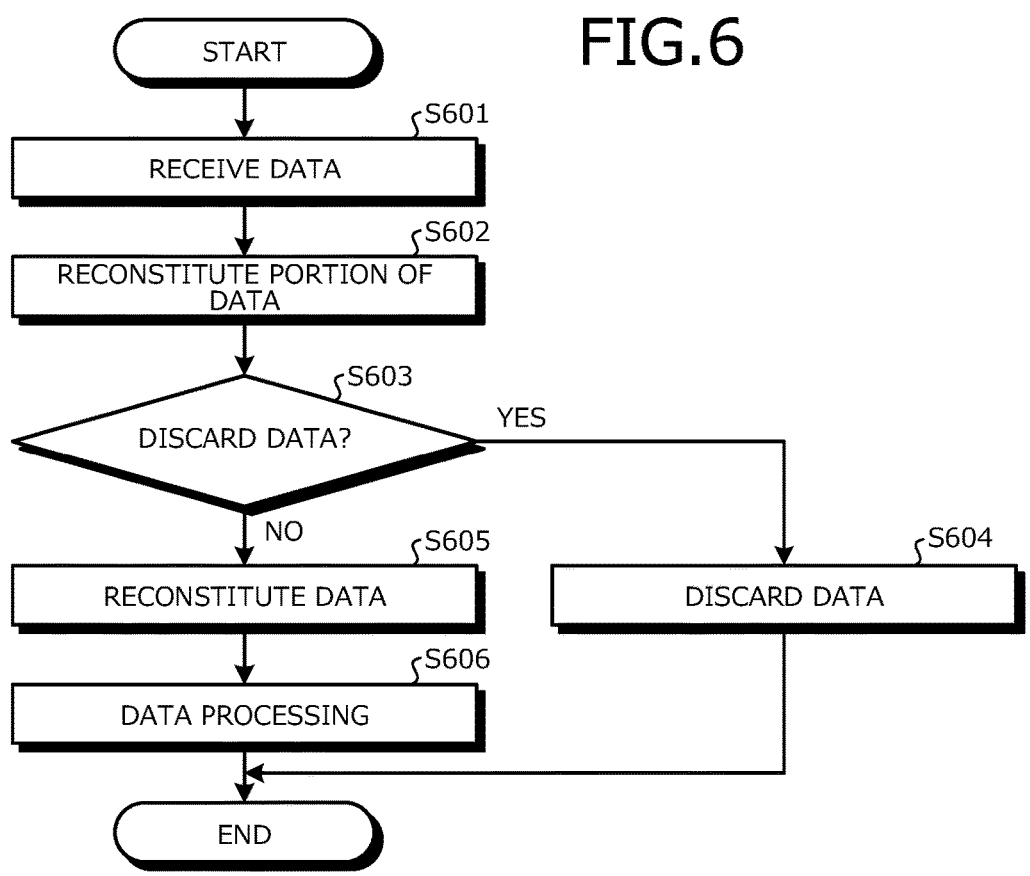
FIG. 6 is a flowchart depicting one example of a procedure of data processing by the engine node 101 according to the first embodiment.

FIG. 6 is a flowchart depicting one example of a procedure of data processing by the engine node 101 according to the first embodiment. In the flowchart depicted in FIG. 6, the receiving unit 501 receives the serialized data 111 (step S601). The reconstituting unit 502 deserializes the specific portion 112 of the received data 111, based on information specifying the referenced portion to select the processing data (step S602).

The selecting unit 503 determines whether to discard the received data 111, based on the deserialized specific portion 112 and the condition for selecting the processing data (step S603). If the selecting unit 503 determines not to discard the received data 111 (step S603: NO), the reconstituting unit 502 deserializes all the received data 111 (step S605). The processing unit 504 executes a query by the deserialized event data 113 (step S606).

On the other hand, if the selecting unit 503 determines to discard the received data 111 (step S603: YES), the selecting unit 503 discards the received data 111 (step S604), ending a series of operations according to the flowchart. By an execution of the operations in the flowchart, only the data 111 that is not discarded by the selecting unit 503 is deserialized.

As described, the engine node 101 receives the serialized data 111 for executing a query. The engine node 101 reconstitutes the specific portion 112 of the received data 111, based on information specifying the specific portion 112 to be referenced to select the processing data. The engine node 101, based on the reconstituted specific portion 112 of the received data 111 and the condition for selecting the processing data, determines whether to discard the received data 111 and when determining not to discard the received data 111, reconstitutes the received data 111.

As a result, the engine node 101 according to the first embodiment is configured to not perform overall data deserialization with respect to the data 111 discarded in the query preprocessing, enabling unnecessary deserialization to be reduced and increases in the load on the engine node 101 to be reduced.

One example of the processing method according to a second embodiment will be described. In the second embodiment, conditions for performing deserialization of the specific portion 112 of the data 111 and for performing overall deserialization of the data 111 are added. Description and drawings of parts identical to the parts described in the first embodiment will be omitted hereinafter.

Figure 7:
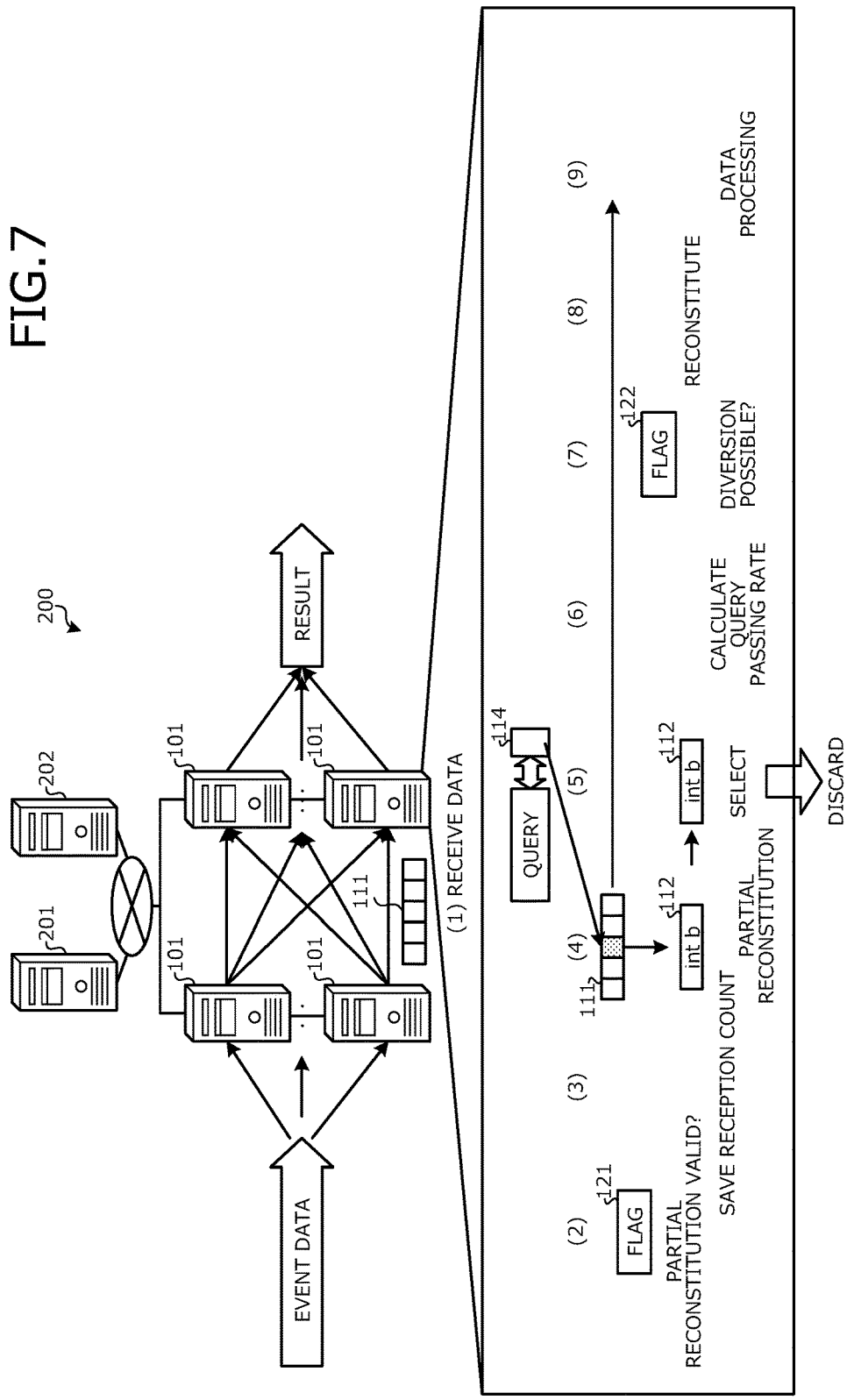
FIG. 7 is a diagram depicting one example of the processing method according to a second embodiment.

FIG. 7 is a diagram depicting one example of the processing method according to the second embodiment. In FIG. 7, the engine node 101 has a flag 121 that indicates the validity or invalidity of deserialization of the specific portion 112 to be referenced for selecting the processing data. The engine node 101 deserializes the specific portion 112 when the flag 121 indicates "valid". The manager node 201 and the compiler node 202 determine the validity or invalidity of the flag 121 and notify the engine node 101.

The engine node 101 further has a flag 122 that indicates that diversion of the data 111 is possible or impossible. The engine node 101 deserializes the data 111, when the flag 122 indicates diversion to be impossible. The compiler node 202 determines whether diversion of the data 111 is possible and notifies the engine node 101. Diversion of the data 111, determination of the validity or invalidity of the deserialization of the specific portion 112, and the determination of whether diversion of the data 111 is possible will be described in detail hereinafter.

The engine node 101 stores a reception count of the data 111 and a count of determinations not to discard the data 111. The engine node 101, based on the stored reception count of the data 111 and the count of determinations not to discard the data 111, calculates and transmits to the manager node 201, a query passing rate. The query passing rate is a ratio of the count of determinations not to discard the data 111 to the reception count of the data 111.

The manager node 201 receives the query passing rate from the engine node 101. The manager node 201, based on the received query passing rate, determines the validity or invalidity of deserialization of the specific portion 112 and notifies the engine node 101 of the determination result. For example, if the query passing rate is a specific value α or less, the manager node 201 determines deserialization of the specific portion 112 to be valid. The specific value α will be described in detail hereinafter.

The compiler node 202 analyzes the query description language, e.g., an EPL, and statically determines the validity or invalidity of deserialization of the specific portion 112. The compiler node 202 notifies the engine node 101 of the determination result. For example, when a parameter included in the referenced portion to select the processing data is a specific count or less and a specific type, the compiler node 202 determines to deserialize the specific portion 112 of the received data 111.

Here, the specific type, for example, is a type having a parameter internally such as a string or class. Further, the compiler node 202 calculates the cost of deserializing the referenced portion to select the processing data. When the calculated cost is less than the cost of deserializing all the data 111, the compiler node 202 can also determine to deserialize the specific portion 112 of the received data 111. Here, the cost is the CPU time or memory used for deserialization by the engine node 101.

The compiler node 202 analyzes the query description language (e.g., an EPL), includes in the data 111, information to be referenced in the query of another engine node, executed after the execution of the query of the current engine node 101, and determines whether diversion of the data 111 is possible. The compiler node 202 notifies the engine node 101 of the determination results. Here, an example of data processing by the engine node 101 according to the second embodiment will be described.

(1) The engine node 101 receives the serialized data 111. The engine node 101 receives the data 111, which has been serialized to execute a query.

(2) The engine node 101 determines whether deserialization of the specific portion 112 is valid or invalid. The engine node 101 refers to the flag 121 that is notified by the manager node 201 and the compiler node 202 and that indicates the validity or invalidity of deserialization of the specific portion, and determines whether deserialization of the specific portion 112 is valid or invalid.

(3) The engine node 101 saves the reception count of the data 111. The engine node 101 saves the reception count of the data 111 to calculate the query passing rate.

(4) If deserialization of the specific portion 112 is valid, the engine node 101 deserializes from the received data 111, the specific portion 112 that is referenced to select the processing data. In the example depicted in FIG. 7, similar to FIG. 1, the engine node 101 deserializes the specific portion 112 from the received data 111, based on information specifying portion b. If deserialization of the specific portion 112 is invalid, the engine node 101 deserializes all the received data 111.

(5) The engine node 101 determines whether to discard the data 111, based on the reconstituted specific portion 112 and the condition for the query to select processing data. The engine node 101 stores the count of determinations not to discard the data 111. In the example depicted in FIG. 7, similar to FIG. 1, the engine node 101 confirms whether the reconstituted specific portion 112 is 1. Received data 111 for which the specific portion 112 is not 1 is data that is not used after query data selecting. In this case, the engine node 101 discards the received data 111.

(6) The engine node 101 calculates the passing rate by dividing the count of determinations not to discard the data 111, by the reception count of the data 111 and notifies the manager node 201 of the query passing rate. The engine node 101 notifies the manager node 201 of the query passing rate as information for the manager node 201 to statically determine the validity or invalidity of deserialization of the specific portion 112.

(7) The engine node 101 determines whether diversion of the data 111 is possible. The engine node 101 refers to the flag 122, which notified by the compiler node 202 and indicates if diversion of the data 111 is possible or impossible, and determines whether diversion of the data 111 is possible.

(8) Upon determining that diversion of the data 111 is possible, the engine node 101 does not deserialize the received data 111.

(9) The engine node 101 executes a query by the received the data 111. The engine node 101 executes the query by the data 111 and outputs the results.

As described, the engine node 101 deserializes the specific portion 112 of the data 111, when a parameter included in the referenced portion to select the processing data is a specific count or less and is a specific type. Further, the engine node 101 deserializes the specific portion 112 of the data 111, when the cost of deserializing the portion referenced for selecting the processing data is less than the cost of deserializing all the data 111. The engine node 101 further deserializes the specific portion 112 of the data 111, when the query passing rate is the predetermined value $\alpha$ or less.

As a result, in cases where reduction of unnecessary deserialization is expected, the engine node 101 can deserialize the specific portion 112.

Further, the engine node 101 does not reconstitute the data 111, in cases when the engine node 101 determines not to discard the data 111 and the data 111 includes information that is referenced for another query executed after execution of the current query.

As a result, configuration is enabled where the engine node 101 does not deserialize data for another engine node 101 executed after the query of the engine node 101 has been executed. Consequently, the engine node 101 can reduce deserialization.

Figure 8:
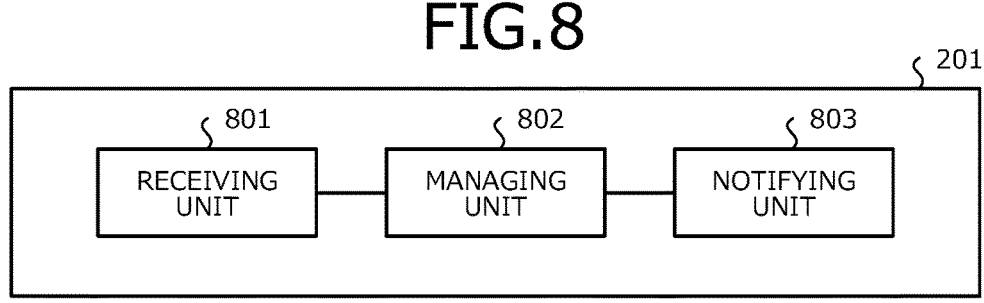
FIG. 8 is a block diagram of an example of a functional configuration of a manager node 201 according to the second embodiment.

FIG. 8 is a block diagram of an example of a functional configuration of the manager node 201 according to the second embodiment. In FIG. 8, the manager node 201 is configured by a receiving unit 801, a managing unit 802, and a notifying unit 803. Functions of the functional units, more specifically, for example, are realized by executing on the CPU 301, programs stored in a storage apparatus such as the memory 302 depicted in FIG. 3. Processing results of the functional units, for example, are stored to a storage apparatus such as the memory 302 depicted in FIG. 3.

The receiving unit 801 has a function of receiving the query passing rate from the engine node 101. The receiving unit 801 passes the received query passing rate to the managing unit 802.

The managing unit 802 has a function of determining from the received query passing rate, the validity or invalidity of deserialization of the specific portion 112. The managing unit 802 passes the determination result to the notifying unit 803. For example, the managing unit 802 determines deserialization of the specific portion 112 to be valid, when the query passing rate is the predetermined value $\alpha$ or less.

The notifying unit 803 has a function of notifying the engine node 101 of the determination result. More specifically, for example, the notifying unit 803 notifies the engine node 101 that is the transmission source of the query passing rate received by the receiving unit 801, of the determination result obtained by the managing unit 802.

The specific value $\alpha$ above may be preset, for example, or may be determined by the manager node 201 as follows.

Here, the deserialization cost in a case of deserializing the specific portion 112 can be expressed using equation (1). Further, the deserialization cost in a case of not deserializing the specific portion 112 can be expressed using equation (2). Where, C1 is the deserialization cost in the case of deserializing the specific portion 112. C2 is the deserialization cost in the case of not deserializing the specific portion 112. c1 is the cost of deserializing the specific portion 112. c2 is the cost of deserializing all the data 111, and p is the query passing rate.

$$C1=c1+c2 \times p \quad (1)$$

$$C2=c2 \quad (2)$$

When the query passing rate p is greater than a specific value, the deserialization cost C1 exceeds the deserialization cost C2. In other words, when the query passing rate p is greater than a specific value and the specific portion 112 is deserialized, the deserialization cost increases compared to a case where the specific portion 112 is not deserialized. Therefore, the manager node 201, for example, determines the predetermined value $\alpha$ to be the value of the query passing rate p whereby the deserialization cost C1 becomes less than the deserialization cost C2.

Figure 9:
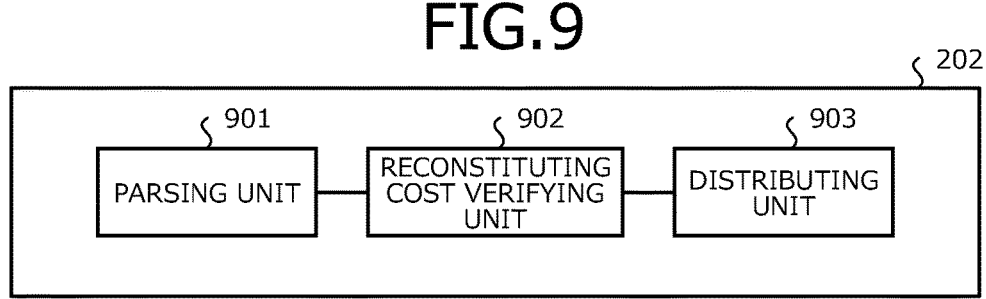
FIG. 9 is a block diagram depicting an example of a functional configuration of a compiler node 202 according to the second embodiment.

FIG. 9 is a block diagram depicting an example of a functional configuration of the compiler node 202 according to the second embodiment. In FIG. 9, the compiler node 202 is configured by a parsing unit 901, a reconstituting cost verifying unit 902, and a distributing unit 903. Functions of the functional units, more specifically, for example, are realized by executing on the CPU 301, programs stored in a storage apparatus such as the memory 302 depicted in FIG. 3. Processing results of the functional units, for example, are stored to a storage apparatus such as the memory depicted in FIG. 3.

The parsing unit 901 has a function of analyzing and translating into an executable query, the query description language (e.g., an EPL). The parsing unit 901 passes the translated query to the distributing unit 903.

The reconstituting cost verifying unit 902 has a function of analyzing the query description language (e.g., an EPL) and determining the validity or invalidity of deserialization the specific portion 112. The reconstituting cost verifying unit 902 passes the determination result of the validity or invalidity to the distributing unit 903. The reconstituting cost verifying unit 902, for example, determines to deserialize the specific portion 112 of the received data 111, when a parameter included in the portion referenced for selecting the processing data is a specific count or less and a specific type. Further, the reconstituting cost verifying unit 902 calculates the cost of deserializing the portion referenced for selecting the processing data. The reconstituting cost verifying unit 902 can also determine to deserialize the specific portion 112 of the received data 111 when the calculated cost is less than the cost of deserializing all the data 111.

The reconstituting cost verifying unit 902 has a further function of analyzing the query description language (e.g., an EPL) and determining whether diversion of the data 111 is possible. The reconstituting cost verifying unit 902 passes the determination result of whether diversion of the data 111 is possible to the distributing unit 903. For example, the EPL of the query of the engine node 101 is assumed to describe "insert Event B select a, c, d, e, f from Event A where b=100".

Further, after execution of the query, the EPL of a query executed by a second engine node 101 thereafter is assumed to describe 'select a, c from Event B where b=100 and e="AAA"'. In this case, a parameter of Event A, which is event data of the engine node 101, is used as a parameter of Event B, which is event data of the second engine node 101. Therefore, the compiler node 202 determines that data diversion is possible.

In contrast, the EPL of the query of the engine node 101 is assumed to be "insert Event B select a, b, count(a), sum(b) from Event A where b=100". In this case, the parameter of Event B, which is the event data of the second engine node 101 thereafter, is a new parameter added in addition to the parameter of Event A, which is the event data of the engine node 101. Therefore, the compiler node 202 determines that data diversion is not possible.

The distributing unit 903 has a function of distributing to the engine node 101, the translated query, the determination result of the validity or invalidity of deserialization of the specific portion 112, and the determination result of the possibility of diverting the data 111.

Figure 10:
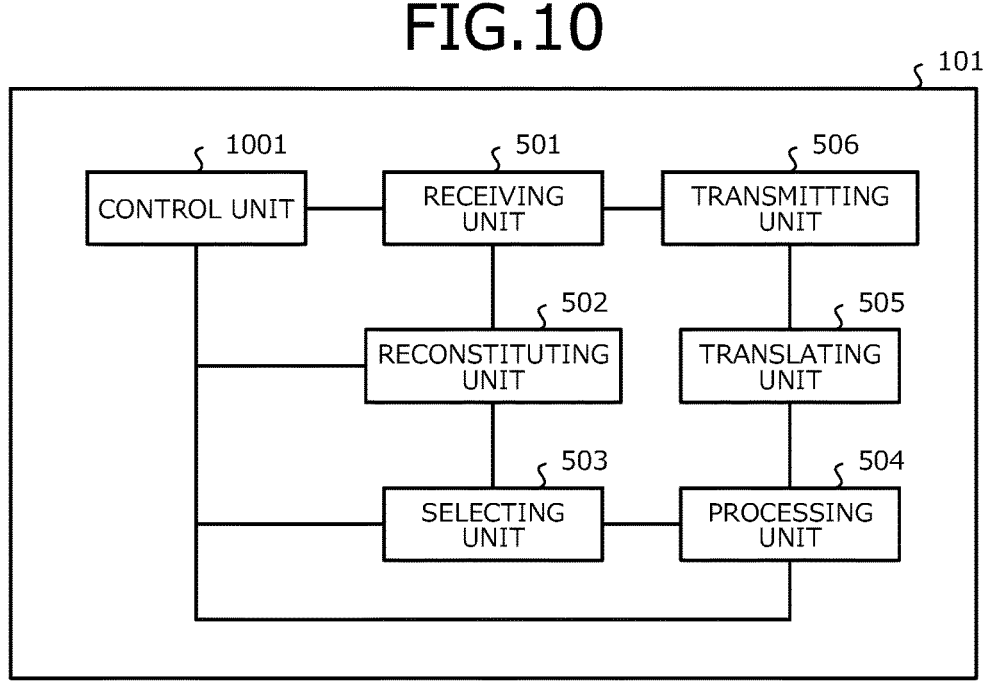
FIG. 10 is a block diagram depicting an example of a functional configuration of the engine node 101 according to the second embodiment.

FIG. 10 is a block diagram depicting an example of a functional configuration of the engine node 101 according to the second embodiment. In FIG. 10, the engine node 101 is configured by the receiving unit 501, the reconstituting unit 502, the selecting unit 503, the processing unit 504, the translating unit 505, the transmitting unit 506, and a control unit 1001. Functions of the control unit 1001, more specifically, for example, are realized by executing on the CPU 301, programs stored in a storage apparatus such as the memory 302 depicted in FIG. 3. Processing results of the functional units, for example, are stored to a storage apparatus such as the memory 302 depicted in FIG. 3.

The receiving unit 501 has a function of notifying the control unit 1001 of reception of the serialized data 111, when the serialized data 111 is received.

The reconstituting unit 502 has a further function of referencing the flag 121 that indicates the validity or invalidity of deserialization of the specific portion 112. When deserialization of the specific portion 112 is valid, the reconstituting unit 502 deserializes the specific portion 112 of the received data 111, based on information specifying the referenced portion for selecting the processing data.

The selecting unit 503 has a further function of notifying the control unit 1001 that the data 111 is not to be discarded, upon determining not to discard the data 111.

The processing unit 504 has a further function of referencing the flag 122 notified by the compiler node 202 and indicating the possibility or impossibility of diversion of the data 111. The processing unit 504 does not deserialize the received data 111, when diversion of the data 111 is possible.

The control unit 1001 has a function of dividing the count of determinations not to discard the data 111, by the reception count of the data 111 to calculate the query passing rate, and a function of notifying the manager node 201 of the query passing rate. The control unit 1001 has a further function of updating the flag 121, which indicates the validity or invalidity of deserialization of the specific portion 112, the control unit 1001 updating the flag 121 based on notification by the manager node 201 and the compiler node 202. The control unit 1001 has yet a further function of updating the flag 122, which indicates the possibility or impossibility of diversion of the data 111, the control unit 1001 updating the flag 122 based on notification by the compiler node 202.

Figure 11:
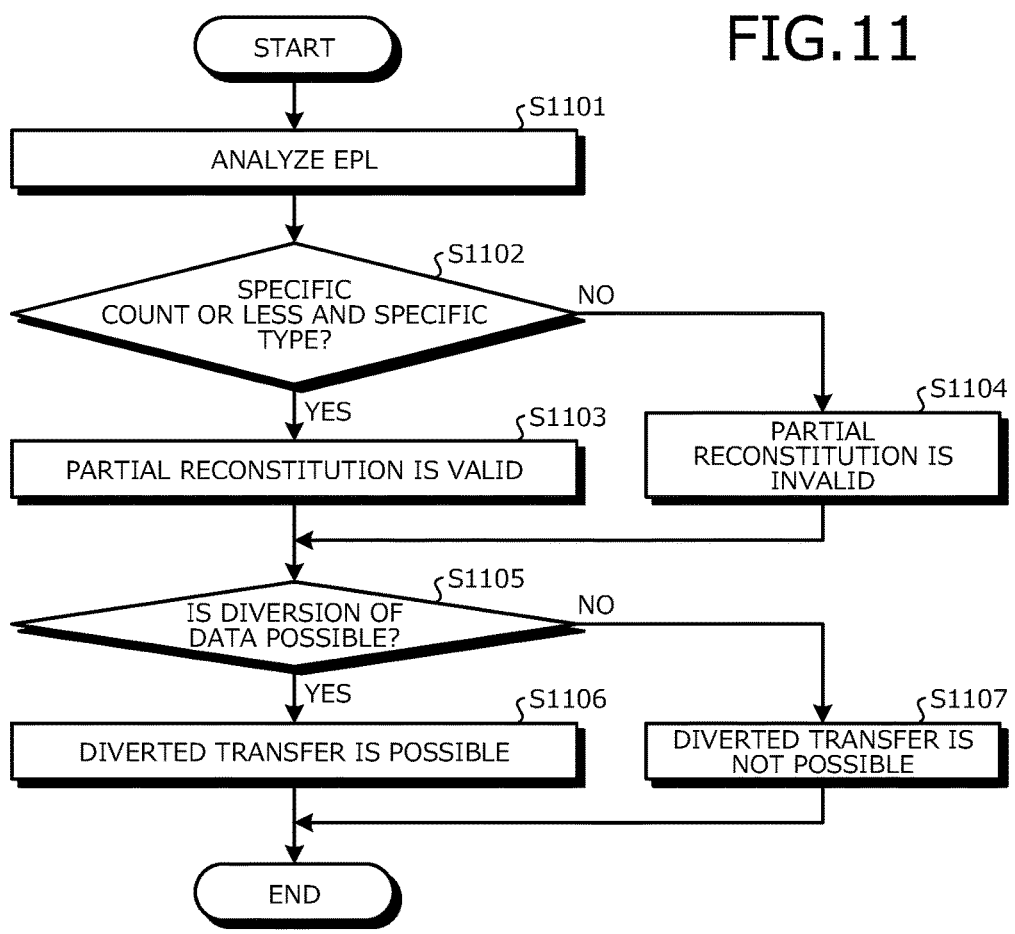
FIG. 11 is a flowchart depicting a reconstitution cost verification process of the compiler node 202 according to the second embodiment.

FIG. 11 is a flowchart depicting a reconstitution cost verification process of the compiler node 202 according to the second embodiment. In the flowchart depicted in FIG. 11, the reconstituting cost verifying unit 902 analyzes the query description language, e.g., an EPL (step S1101). The reconstituting cost verifying unit 902 confirms whether a parameter included in the referenced portion to select the processing data is at most a specific count and a specific type (step S1102).

If the parameter is the specific count or less and the specific type (step S1102: YES), the reconstituting cost verifying unit 902 determines that deserialization of the specific portion 112 is valid (step S1103). If the parameter is greater than the specific count or not the specific type (step S1102: NO), the reconstituting cost verifying unit 902 determines that deserialization of the specific portion 112 is invalid (step S1104).

Subsequently, the reconstituting cost verifying unit 902 analyzes the query description language (e.g., an EPL) and determines whether diversion of the data 111 is possible (step S1105). Upon determining that data diversion is possible (step S1105: YES), the reconstituting cost verifying unit 902 determines that diverted transfer of the data 111 is possible (step S1106). On the other hand, upon determining that data diversion is not possible (step S1105: NO), the reconstituting cost verifying unit 902 determines that diverted transfer of the data 111 is not possible (step S1107), ending a series of operations according to the flowchart. By an execution of the operations in the flowchart, the validity and invalidity of deserialization of the specific portion 112, and the possibility and impossibility of diverted transfer of the data 111 are determined.

Figure 12:
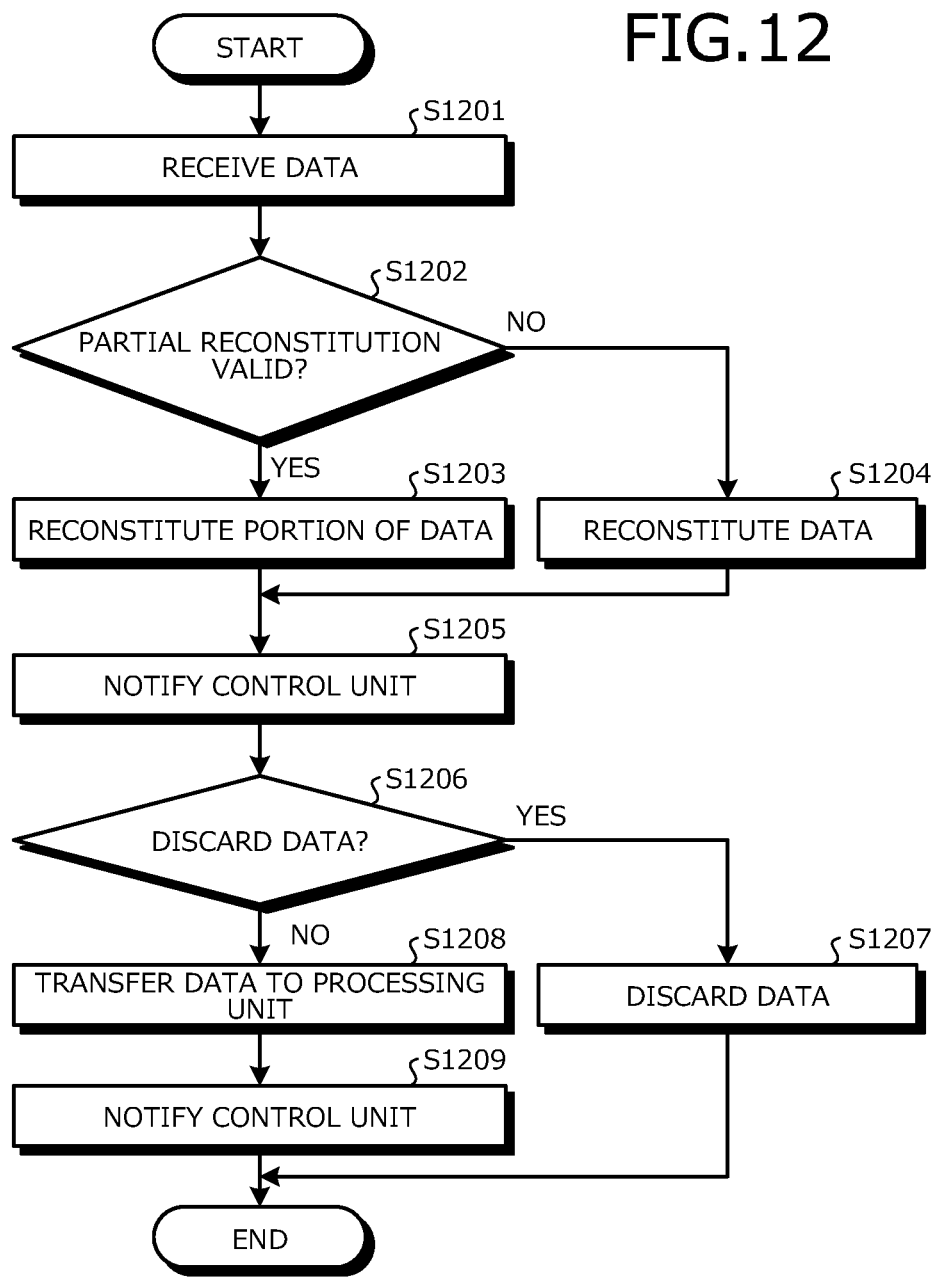
FIG. 12 is a flowchart (part 1) depicting one example of a data processing procedure by the engine node 101 according to the second embodiment.

FIG. 12 is a flowchart (part 1) depicting one example of a data processing procedure by the engine node 101 according to the second embodiment. In the flowchart depicted in FIG. 12, the receiving unit 501 receives the serialized data 111 (step S1201). The reconstituting unit 502 refers to the flag 121, which indicates the validity or invalidity of deserialization, and confirms the validity or invalidity of deserialization of the specific portion 112 (step S1202). If deserialization of the specific portion 112 is valid (step S1202: YES), the reconstituting unit 502 deserializes the specific portion 112 (step S1203). If deserialization of the specific portion 112 is invalid (step S1202: NO), the reconstituting unit 502 deserializes all the received data 111 (step S1204).

The receiving unit 501 notifies the control unit 1001 of the reception of the serialized data 111 (step S1205). Subsequently, the selecting unit 503 determines whether to discard the received data 111, based on the deserialized specific portion 112 and the condition for selecting the processing data (step S1206). Upon determining not to discard the received data 111 (step S1206: NO), the selecting unit 503 transfers the received data 111 to the processing unit 504 (step S1208), and notifies the control unit 1001 that the data 111 is not to be discarded (step S1209).

On the other hand, upon determining to discard the received data 111 (step S1206: YES), the selecting unit 503 discards the received data 111 (step S1207), ending a series of operations according to the flowchart. By an execution of the operations in the flowchart, when deserialization of the specific portion 112 is valid, the specific portion 112 is deserialized and only the data 111 not discarded by the selecting unit 503 is deserialized.

Figure 13:
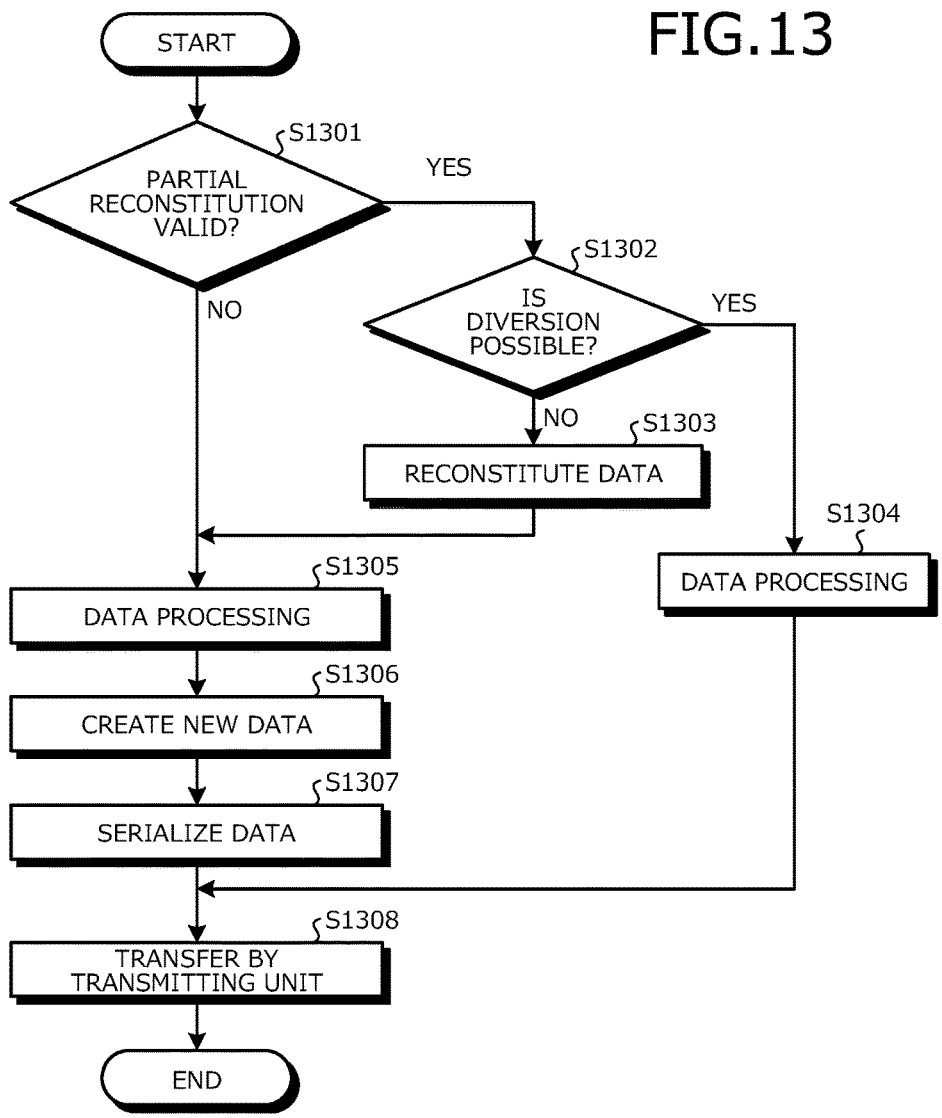
FIG. 13 is a flowchart (part 2) of an example of a data processing procedure by the engine node 101 according to the second embodiment.

FIG. 13 is a flowchart (part 2) of an example of a data processing procedure by the engine node 101 according to the second embodiment. In the flowchart depicted in FIG. 13, the processing unit 504 references the flag 121 indicating the validity or invalidity of deserialization, and confirms the validity or invalidity of deserialization of the specific portion 112 (step S1301). If deserialization of the specific portion 112 is valid (step S1301: YES), the processing unit 504 references the flag 122 indicating the possibility or impossibility of diversion of the data 111, and confirms the possibility impossibility of diversion of the data 111 (step S1302).

If diversion is possible (step S1302: YES), the processing unit 504 executes a query by the received data 111 (step S1304) and thereafter, transitions to step S1308. On the other hand, if diversion of the data 111 is impossible (step S1302: NO), the reconstituting unit 502 deserializes all the received data 111 (step S1303) and thereafter, transitions to step S1305.

If deserialization of the specific portion 112 is invalid (step S1301: NO), the processing unit 504 executes the query by the deserialized event data 113 (step S1305). The processing unit 504 adds to the data, a new parameter generated by data processing and creates new data (step S1306). The translating unit 505 serializes the new data into a byte string (step S1307).

Finally, the transmitting unit 506 transmits the serialized data to another engine node 101 (step S1308), ending a series of operations according to the flowchart. By an execution of the operations in the flowchart, when diversion of the data 111 is possible, the data 111 that has passed the query selecting process is not deserialized.

Figure 14:
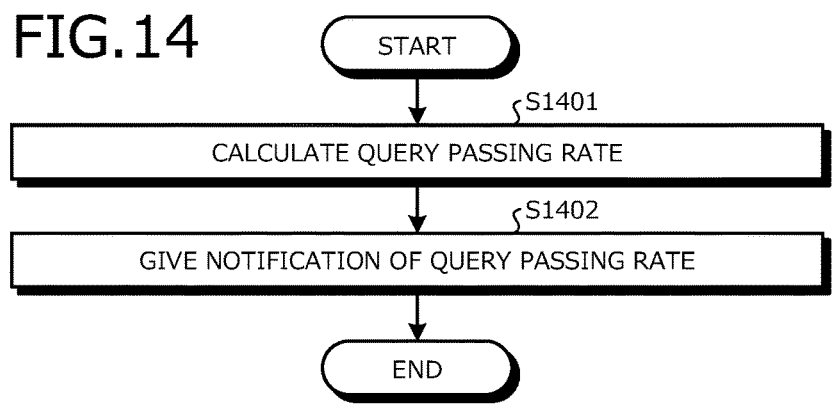
FIG. 14 is a flowchart of a procedure of passing rate processing by the engine node 101 according to the second embodiment.

FIG. 14 is a flowchart of a procedure of passing rate processing by the engine node 101 according to the second embodiment. In the flowchart depicted in FIG. 14, the control unit 1001 calculates the query passing rate from the count of determinations not to discard the data 111 and the reception count of the data 111 (step S1401). The control unit 1001 notifies the manager node 201 of the calculated very passing rate (step S1402), ending a series of operations according to the flowchart. By an execution of the operations in the flowchart, the manager node 201 is notified of the query passing rate.

Figure 15:
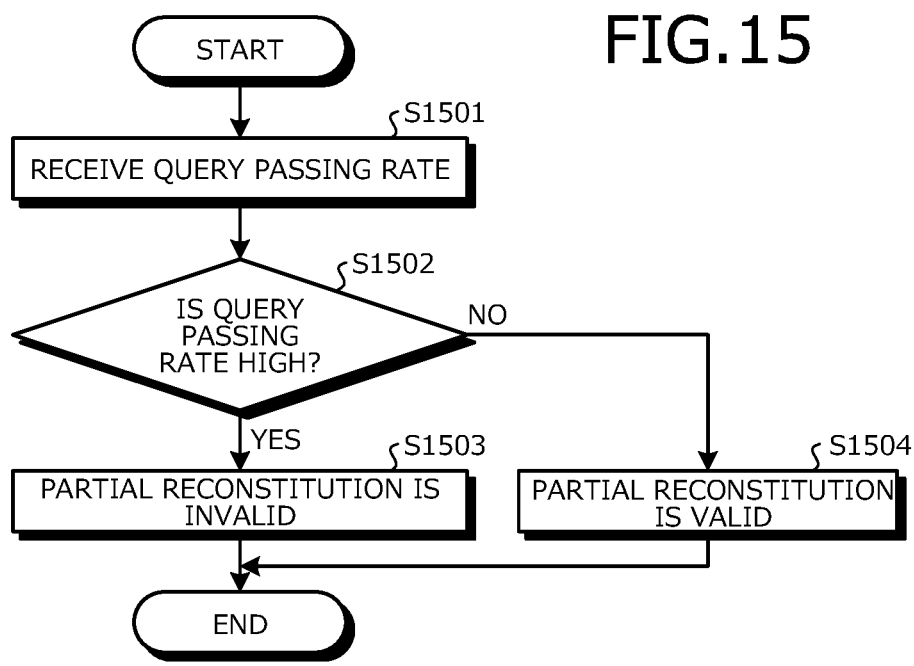
FIG. 15 is a flowchart depicting a procedure of a partial reconstitution determining process by the manager node 201 according to the second embodiment.

FIG. 15 is a flowchart depicting a procedure of a partial reconstitution determining process by the manager node 201 according to the second embodiment. In the flowchart depicted in FIG. 15, the receiving unit 801 receives from the engine node 101, the query passing rate (step S1501). Subsequently, the managing unit 802 confirms whether the query passing rate is greater than the predetermined value (step S1502).

If the query passing rate is greater than the predetermined value (step S1502: YES), the managing unit 802 determines that deserialization of the specific portion 112 is invalid (step S1503). If the query passing rate is the predetermined value or less (step S1502: NO), the managing unit 802 determines that deserialization of the specific portion 112 is valid (step S1504), ending a series of operation according to the flowchart. By an execution of the operation in the flowchart, the validity/invalidity of deserialization of the specific portion 112 is determined.

As described, the engine node 101 deserializes the specific portion 112 of the data 111, when parameters included in the portion referenced to select the processing data are a specific count or less and a specific type. Further, the engine node 101 deserializes the specific portion 112 of the data 111, when the cost of deserializing the portion referenced to select the processing data is less than the cost of deserializing all the data 111. The engine node 101 further deserializes the specific portion 112 of the data 111, when the passing rate is the predetermined value or less.

Thus, when a reduction of unnecessary deserialization is expected, the engine node 101 can deserialize the specific portion 112.

Further, the engine node 101 does not reconstitute the data 111, when the data 111 is not to be discarded and includes information referenced by another query executed after execution of current query.

As a result, configuration is enabled where the engine node 101 does not deserialize data for another engine node 101 executed after the query of the engine node 101 has been executed. Consequently, the engine node 101 can reduce deserialization.

One example of the processing method according to a third embodiment will be described. In the third embodiment, a case will be described where a query passing rate for a data group of grouped data serialized for executing a query is regarded as a determination criterion and the engine node 101 to be assigned the data group is determined. Description and drawings of parts identical to the parts described in the first and second embodiments will be omitted hereinafter.

Figure 16:
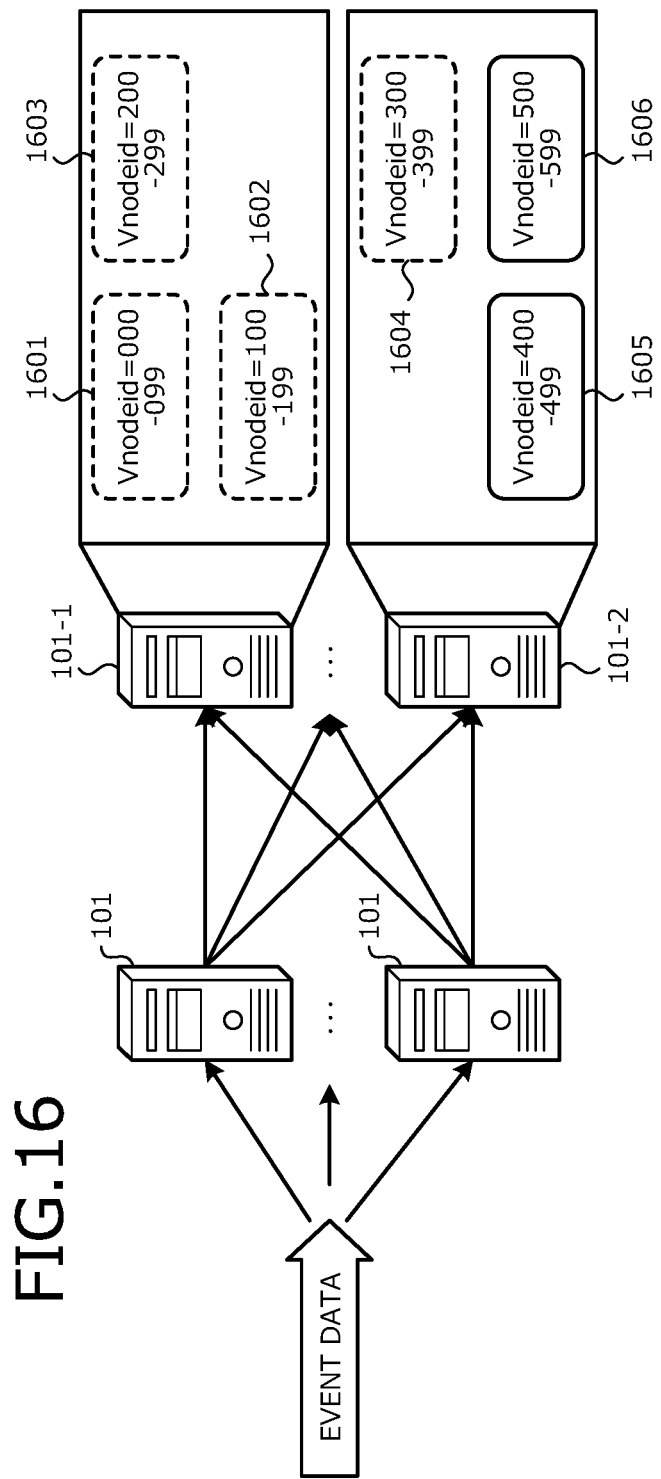
FIG. 16 is a diagram depicting one example of the processing method according to a third embodiment.

FIG. 16 is a diagram depicting one example of the processing method according to the third embodiment. In the third embodiment, when the same query is processed in parallel, multiple data serialized for executing the query are divided into multiple data groups. The manager node 201 assigns the data by data group, to the engine nodes 101.

For example, an id (parameter) is appended to serialized data and according to the id of each data, the data are divided into data groups of specified parameter value ranges. The id is an identifier of serialized data. Herein, a data group of a specific parameter value range is indicated as "Vnode".

In the example depicted in FIG. 16, for example, A Vnode 1601 is a data group of ids "000 to 099" and assigned to the engine node 101-1. Further, for example, A Vnode 1604 is a data group of ids "300 to 399" and assigned to the engine node 101-2.

The engine node 101 stores according to Vnode, the reception count of the data 111 and the count of determinations not to discard the data 111. The engine node 101 calculates for each Vnode, the query passing rate, which is the ratio of the count of determinations not to discard the data 111 to the reception count of the data 111, and transmits the query passing rates to the manager node 201.

The manager node 201 receives from the engine node 101, the query passing rates for each Vnode. The manager node 201 assigns a Vnode to another engine node 101, when the load of an engine node 101 has become higher than a prescribed value such as when the utilization rate of the PCU or memory of the engine node 101 has become higher than a prescribed value. In this case, the manager node 201 determines the Vnode to be migrated and the engine node 101 to be assigned the Vnode, based on the overall query passing rate of the engine node 101 and the query passing rate of each Vnode.

For example, the manager node 201 assigns a Vnode for which the query passing rate is a predetermined value or less to an engine node 101 for which deserialization of the specific portion 112 is valid, i.e., an engine node 101 for which the query passing rate is the predetermined value α or less. Further, the manager node 201 assigns a Vnode for which the query passing rate is a predetermined value γ or greater to an engine node 101 for which deserialization of the specific portion 112 is invalid, i.e., an engine node 101 for which the query passing rate is greater than the predetermined value α. The predetermined value β is a value less than or equal to the predetermined value α. Further, the predetermined value γ is greater than or equal to the predetermined value α.

In the example depleted in FIG. 16, deserialization of the specific portion 112 is assumed to be invalid in the engine node 101-1, and deserialization of the specific portion 112 is assumed to be valid in the engine node 101-2. Further, in the engine node 101-1, the query passing rate of the Vnode 1601 is assumed to be the predetermined value β or less, and the query passing rate of a Vnode 1602 is assumed to be the predetermined value γ or greater. In the engine node 101-2, the query passing rate of the Vnode 1604 is assumed to be the predetermined value β or less, and the query passing rate of the Vnode 1605 is assumed to be the predetermined value γ or greater.

In this case, when the load of the engine node 101-1 becomes higher than the prescribed value and a Vnode of the engine node 101-1 is to be assigned to the engine node 101-2, the manager node 201 assigns the Vnode 1602 to the engine node 101-2. On the other hand, when the load of the engine node 101-2 becomes higher than the prescribed value and a Vnode of the engine node 101-2 is to be assigned to the engine node 101-1, the manager node 201 assigns the Vnode 1604 to the engine node 101-1.

As a result, the manager node 201 can assign a Vnode for which the query passing rate is the predetermined value β or less, to an engine node 101 for which deserialization of the specific portion 112 is valid. Further, the manager node 201 can assign a Vnode for which the query passing rate is the predetermined value γ or greater, to an engine node 101 for which deserialization of the specific portion 112 is invalid.

Therefore, the manager node 201 can equalize load with consideration of reducing unnecessary deserialization by the engine nodes 101.

Figure 17:
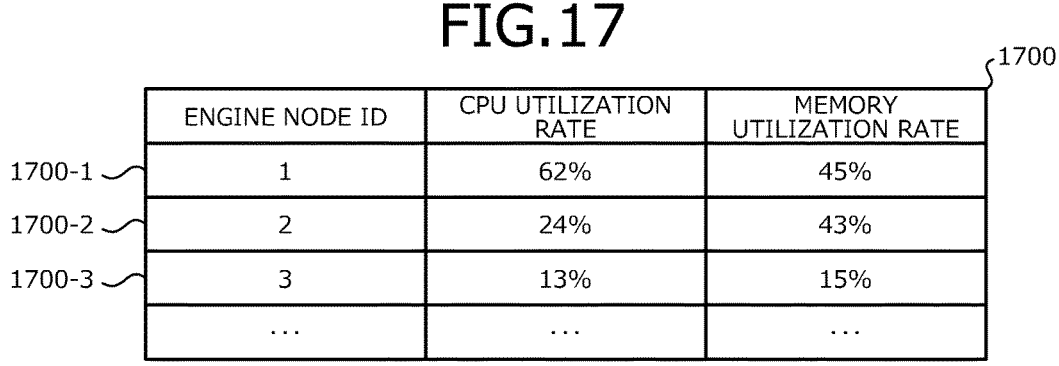
FIG. 17 is a diagram depicting one example of an engine node table 1700.

FIG. 17 is a diagram depicting one example of an engine node table 1700. In FIG. 17, the engine node table 1700 has fields for engine node IDs, CPU utilization rates, and memory utilization rates, and by a setting of information into each field, engine node information (for example, engine node information 1700-1 to 1700-3) is stored as records.

Here, an engine node ID is an identifier of an engine node 101. The CPU utilization race is the utilization rate of the CPU of the engine node 101. The memory utilization rate is the utilization rate of the memory of the engine node 101. For example, the engine node information 1700-1 indicates an engine node 101 having an engine node ID of "1", a CPU utilization rate of "62%" and a memory utilization rate of "45%".

The manager node 201 periodically receives from the engine nodes 101, CPU utilization rates and memory utilization rates, and updates the engine node table 1700. Based on the engine node table 1700, the manager node 201 determines loads of the engine nodes 101 and assigns a data group of an engine node 101 for which the load is higher than a prescribed value to another engine node 101.

FIG. 18 is a diagram depicting one example of a query table 1800. In FIG. 18, the query table 1800 has fields for query IDs, engine node IDs, query passing rates, partial reconstitution, and parallel processing, and by a setting of information into each of the fields, query information (for example, query information 1800-1 to 1800-5) is stored as records.

Here, a query ID is an identifier of a query. The engine node ID is the identifier of the engine node 101 that executes the query of the query ID. The query passing rate is the rate of the data 111 discarded by the engine node 101. Partial reconstitution is information indicating whether deserialization of the specific portion 112 is valid for the query of the query ID. Parallel processing is information indicating whether the query of the query ID is a parallel query. A parallel query is a query that can be distributed among multiple nodes and executed. For example, the query information 1800-1 indicates that a query of query ID "Q1" is executed by the engine node 101 of the engine node ID "1", has a query passing rate of "5%", partial reconstitution thereof is "valid" and parallel processing thereof is "possible".

The manager node 201 obtains the query passing rate from the engine node 101 that executes the query, and obtains from the compiler node 202, indication of whether deserialization of the specific portion 112 is valid. The manager node 201, when migrating a Vnode based on the query table 1800, confirms whether the query can be processed in parallel, and determines the engine node 101 to which the Vnode is to be assigned.

FIG. 19 is an example depicting one example of a Vnode information table 1900. In FIG. 19, the Vnode information table 1900 has fields for Vnode IDs, ids, query IDs, and query passing rates, and by a setting of information into each of the fields, Vnode information (for example, Vnode information 1900-1 to 1900-4) is stored as records.

Here, a Vnode ID is an identifier of a Vnode. An id is an identifier of data. The query ID is the identifier of the query executed by the Vnode. The query passing rate is the rate that the data 111 is discarded for the Vnode ID. For example, the Vnode information 1900-1 indicates that a Vnode "D1" includes data of "ids=000 to 099"; the query of the query ID "Q1" is executed; and the query passing rate is 7%".

The manager node 201 stores for each Vnode, the query passing rate and the query ID executed using the Vnode. The manager node 201 obtains the query passing rate for each Vnode from the engine node 101 that executes the corresponding query. Based on the Vnode table 1900, the manager node 201 sets a Vnode that is to be migrated.

Figures 20, 21:
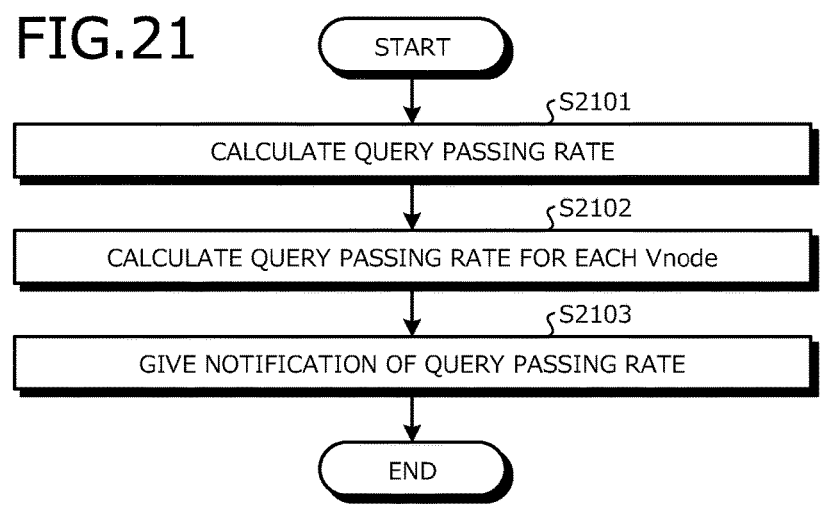
FIG. 20 is a diagram depicting one example of a routing table 2000.
FIG. 21 is a flowchart depicting one example of a passing rate processing procedure of the engine node 101 according to the third embodiment.

FIG. 20 is a diagram depicting one example of a routing table 2000. In FIG. 20, the routing table 2000 has fields for query IDs, Vnode IDs, and engine node IDs, and by a setting of information into each of the fields, routing information (for example, routing information 2000-1 to 2000-2) is stored as records.

Here, the query ID is the identifier of the query. The Vnode ID is the identifier of the Vnode. The engine node ID is the identifier of the engine node 101. For example, the routing information 2000-1 indicates that the query ID "Q1" and the Vnode "D1" are transferred to the engine node 101 of the engine node ID "1".

The transmitting unit 506 of the engine node 101 transmits the serialized data to an engine node 101, based on the routing table 2000.

An example of a functional configuration of the engine node 101 according to the third embodiment is identical to that of the second embodiment and therefore, depiction thereof is omitted herein. Further, description of portions identical to portions described in the first embodiment and the second embodiment will be omitted herein.

The receiving unit 501 has a function of notifying the control unit 1001 of the receipt of the serialized data 111 and information identifying the Vnode that includes the data 111. The information identifying the Vnode that includes the data 111 is the Vnode ID.

The selecting unit 503 has a function of notifying the control unit 1001 of the information identifying the Vnode that includes the data 111 and a function of notifying the control unit 1001 that the data 111 is not to be discarded.

The control unit 1001 has a function of calculating the query passing rate for each Vnode, from the count of determinations not to discard the data 111 and the reception count of the data 111, and a function of notifying the manager node 201 of the query passing rates.

An example of a functional configuration of the manager node 201 according to the third embodiment is identical to that of the second embodiment and therefore, depiction thereof is omitted herein. Further, description of portions identical to portions described in the first embodiment and the second embodiment will be omitted herein.

The receiving unit 801 has a function of receiving from the engine nodes 101, the query passing rate for each Vnode. The receiving unit 801 passes the query passing rates received for each Vnode to the managing unit 802.

The managing unit 802 has a function of updating the query table 1800 by the query passing rates for each Vnode and migrating a Vnode to another engine node 101.

FIG. 21 is a flowchart depicting one example of a passing rate processing procedure of the engine node 101 according to the third embodiment. In the flowchart depicted in FIG. 21, the control unit 1001 calculates the overall query passing rate of the engine nodes 101, from the count of determinations not to discard the data 111 and the reception count of the data 111 (step S2101). Subsequently, the control unit 1001 calculates the query passing rate for each Vnode, from the count of determination not to discard the data 111 and the reception count of the data 111 (step S2102).

The control unit 1001 notifies the manager node 201 of the calculated overall query passing rate of the engine nodes 101 and the query passing rate calculated for each Vnode (step S2103), ending a series of operations according to the flowchart. By an execution of the operations in the flowchart, the manager node 201 of notified of the overall query passing rate of the engine nodes 101 and the query passing rate for each Vnode.

Figure 22:
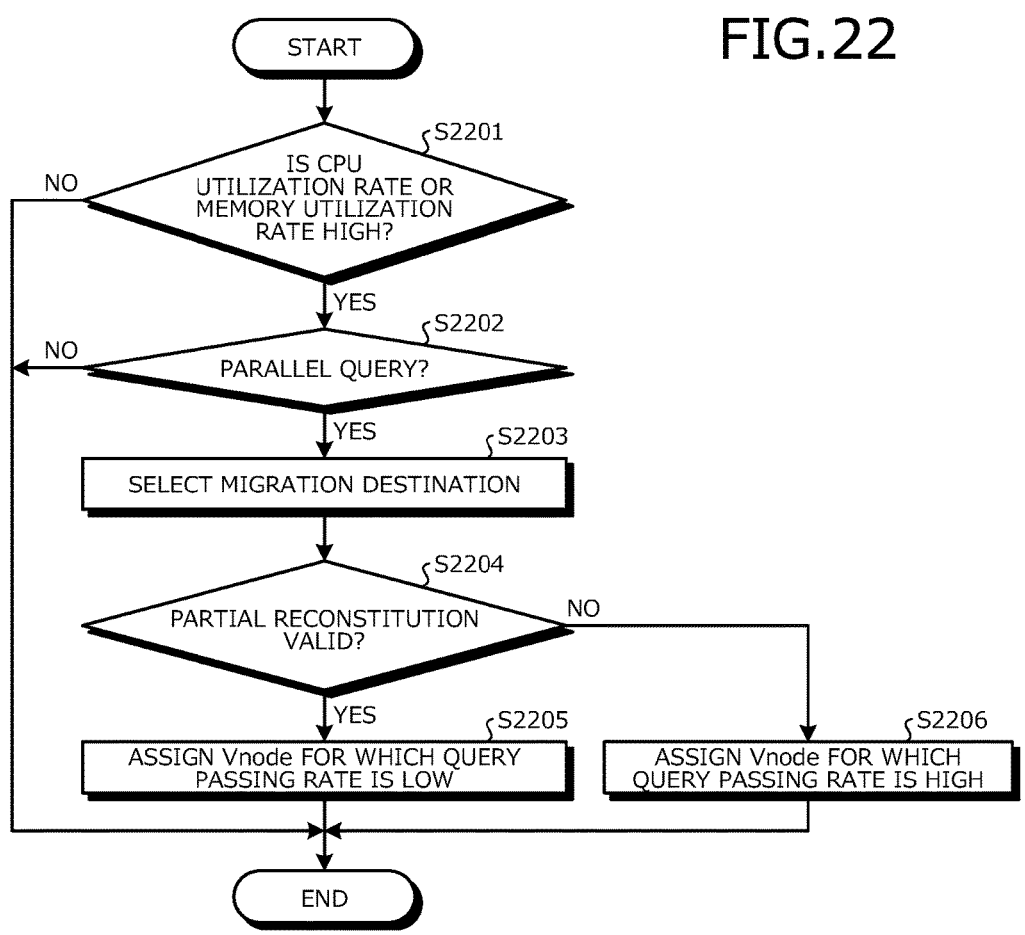
FIG. 22 is a flowchart depicting one example of a Vnode migration process procedure by the manager node 201 according to the third embodiment.

FIG. 22 is a flowchart depicting one example of a Vnode migration process procedure by the manager node 201 according to the third embodiment. In the flowchart depicted in FIG. 22, the managing unit 802 confirms from the engine node table 1700, whether an engine node 101 is present for which the CPU utilization rate or the memory utilization rate is higher than a prescribed value (step S2201). If an engine node 101 for which the CPU utilization rate or the memory utilization rate is higher than the prescribed value is present (step S2201: YES), the managing unit 802 confirms whether the query executed by the engine node 101 is a parallel query (step S2202). The managing unit 802 references the query table 1800 and makes the confirmation from the query table 1800.

If the query is a parallel query (step S2202: YES), the managing unit 802 selects an engine node 101 to be a migration destination for a Vnode (step S2203). For example, the managing unit 802 selects from the engine node table 1700, the engine node 101 for which the CPU utilization rate or the memory utilization rate is lower than the prescribed value.

The managing unit 802 confirms whether deserialization of the specific portion 112 is valid or invalid at the selected engine node 101 (step S2204). The managing unit 802, for example, confirms whether deserialization of the specific portion 112 is valid or invalid by the query passing rate in the query table 1800. If deserialization of the specific portion 112 is valid (step S2204: YES), the managing unit 802 assigns to the selected engine node 101, a Vnode for which the query passing rate is the predetermined value β or less (step S2205).

If deserialization of the specific portion 112 is invalid (step S2204: NO), the managing unit 802 assigns to the selected engine node 101, a Vnode for which the query passing rate is the predetermined value γ or greater (step S2206). The managing unit 802, for example, references the passing rate for each Vnode from the Vnode information table 1900 to confirm a Vnode for which the query passing rate is the predetermined value β or less and a Vnode for which the query passing rate is the predetermined value γ or greater.

Further, if no engine node 101 is present for which the CPU utilization rate or the memory utilization rate is higher than the prescribed value (step S2201: NO), or if the query is not a parallel query (step S2202: NO), the managing unit 802 ends the process. As a result, a series of the operations according to the flowchart ends. By an execution of the operations in the flowchart, a Vnode can be assigned to a suitable engine node 101.

As described, the engine node 101 calculates a first ratio of the count of determinations not to discard the data 111 to the reception count of the data 111. Further, the engine node 101 calculates for each Vnode, a second ratio of the count of determinations not to discard the data 111 included in the Vnode to the reception count of the data included in the Vnode. The manager node 201, based on the first ratio and the second ratio calculated for each of the multiple engine nodes 101, determines the Vnodes to be assigned to the engine nodes 101. For example, the manager node 201 determines a Vnode for which the second ratio becomes the predetermined value β or less to be the Vnode to be assigned to an engine node 101 for which the first ratio becomes the predetermined value α or less. Further, the manager node 201 determines a Vnode for which the second ratio becomes the predetermined value γ or greater as the Vnode to be assigned to the engine node 101 for which the first ratio is greater than the predetermined value α.

As a result, the manager node 201 can assign a Vnode for which the query passing rate is the predetermined value β or less to an engine node 101 for which deserialization of the specific portion 112 is valid. Further, the manager node 201 can assign a Vnode for which the query passing rate is the predetermined value γ or greater to an engine node 101 for which deserialization of the specific portion 112 is invalid. Consequently, the manager node 201 can equalize load while taking reduction of unnecessary deserialization by the engine nodes 101 into consideration.

The processing method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

According to one aspect of the invention, an effect is achieved in that unnecessary deserialization can be reduced.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A processing system for processing a query on serialized data, the system comprising:
    an information processing apparatus including a processor that with each reception of serialized data, deserializes a specific portion of the received data, based on reference information defined in the query and specifying a referenced portion of the received data for selecting processing data, the processing data being subject to the query processing; determines whether to discard the received data, based on the deserialized specific portion of the received data and a selecting condition defined in the query for selecting the processing data; and deserializes the data, when determining not to discard the received data; and
    a control apparatus including a processor that determines whether a first ratio of a count of determinations not to discard the data by the information processing apparatus to a count of receptions of the data by the information processing apparatus is a first threshold or less, wherein
    the information processing apparatus deserializes the specific portion of the received data when the control apparatus calculates the first ratio and determines that the first ratio is the first threshold or less,
    the first threshold is determined by the control apparatus as the value of the first ratio for which the deserialization cost in the case of deserializing the specific portion becomes less than the deserialization cost in the case of not deserializing the specific portion, and wherein the deserialization cost is a CPU (Central Processing Unit) time cost or a memory cost.

2. The processing system according to claim 1, wherein the control apparatus determines whether a parameter included in the referenced portion for selecting the processing data is at most a specific count and a specific type, and
    the information processing apparatus deserializes the specific portion of the data when the control apparatus determines that the parameter is the specific count or less and the specific type.

3. The processing system according to claim 2, wherein the specific type is a type having a parameter internally.

4. The processing system according to claim 1, wherein the control apparatus determines whether the data includes information referenced by another query executed after the query is executed, and
    the information processing apparatus refrains from deserializing the data when the control apparatus determines not to discard the data and the data includes the information referenced by another query.

5. The processing system according to claim 1, wherein the control apparatus determines for each of a plurality of information processing apparatuses, a data group to be assigned to the information processing apparatus, based on the first ratio and a second ratio of a count of determinations not to discard the data included in the data group to a reception count of the data included in the data group.

6. The processing system according to claim 5, wherein the control apparatus determines the data group to be assigned to the information processing apparatus such that a data group for which the second ratio is a second threshold or less is assigned to an information processing apparatus for which the first ratio is the first threshold or less.

7. The processing system according to claim 5, wherein the control apparatus determines the data group to be assigned to the information processing apparatus such that a data group for which the second ratio is a third threshold or greater is assigned to an information processing apparatus for which the first ratio is greater than the first threshold.

8. The processing system according to claim 5, wherein when a load of an information processing apparatus has become higher than a prescribed value, the control apparatus assigns a data group assigned to the information processing apparatus to another information processing apparatus, thereby equalizing the load among the information processing apparatuses.

* * * * *